Oct. 2, 1951    A. J. DAVIS    2,569,601
EXPANDER RING FOR COMBUSTION ENGINES
Filed Sept. 19, 1950
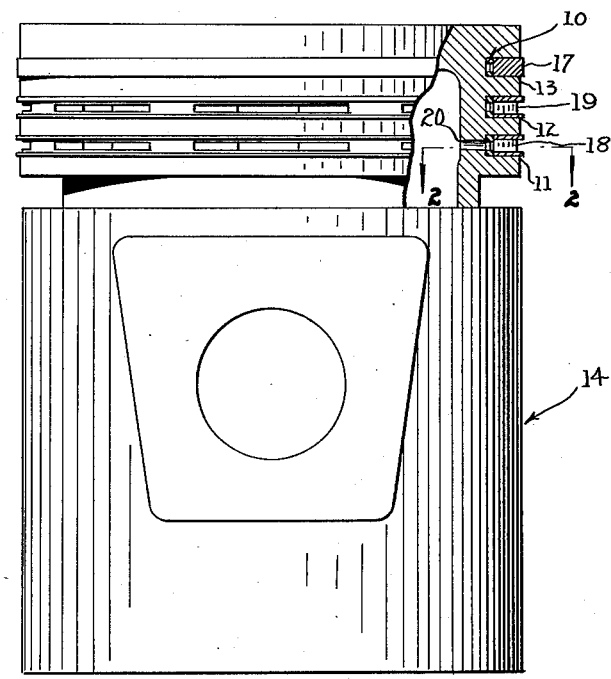
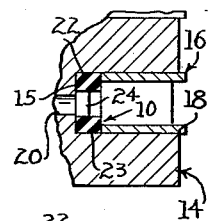
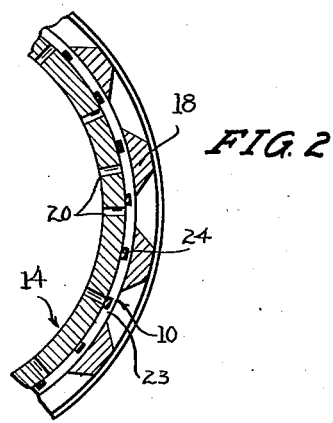
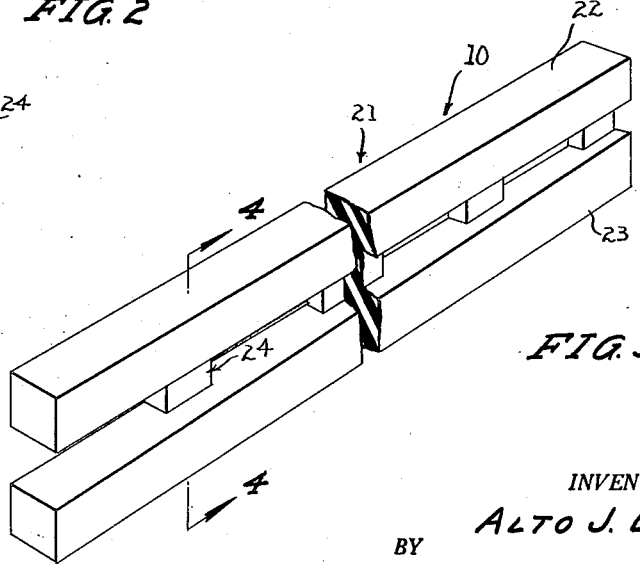
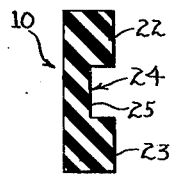
INVENTOR.
ALTO J. DAVIS
BY
McMorrow, Berman & Davidson
ATTORNEYS Patented Oct. 2, 1951

2,569,601

UNITED STATES PATENT OFFICE 2,569,601

EXPANDER RING FOR COMBUSTION ENGINES

Alto J. Davis, Montgomery, Ala.

Application September 19, 1950, Serial No. 185,528

1 Claim. (Cl. 309—43)

This invention relates to piston rings, and more particularly to an expander ring for a combustion engine.

An object of this invention is to provide an expander ring for use with the conventional piston rings of a combustion engine which is particularly adapted to effectively decrease engine noises due to metallic contacting between the piston ring and the piston and cylinder.

Another object of this invention is to provide an expander ring for use with the conventional piston rings of a combustion engine which is particularly adapted to exert a uniform force at more points along the piston ring to thereby form an effective seal between the latter and the cylinder wall.

A further object of this invention is to provide an expander ring for use with ventilated oil rings of combustion engines which is particularly adapted to exert a uniform force at all points along the oil ring to thereby insure a relatively uniform removal of the excess oil from the cylinder wall.

A still further object of this invention is to provide an expander ring for combustion engines which is relatively simple in structure and cheap to manufacture.

The above and still further objects and advantages of the invention will become apparent upon consideration of the followed detailed description of the invention, when taken in conjunction with the accompanying drawing, wherein:

Figure 1 is an elevational view, with parts broken away and in section, showing the expander ring of the present invention supported in the ring grooves of a piston intermediate the bottom faces of the grooves and the piston rings;

Figure 2 is an enlarged fragmentary sectional view taken along the line 2—2 of Figure 1;

Figure 3 is a perspective view of the expander ring of the present invention, shown broken away intermediate its ends;

Figure 4 is a sectional view taken along the line 4—4 of Figure 3; and

Figure 5 is an enlarged fragmentary sectional view showing an expander ring supported in the ring grooves of a piston intermediate the bottom face of the groove and a piston ring.

Referring now more particularly to the drawings, wherein like reference numerals have been used throughout the several views to designate like parts, there is shown the expander ring of the present invention, generally designated by the reference numeral 10 supported in the grooves 11, 12 and 13 of the piston 14. As clearly shown in Figure 5, the expander ring 10 is supported intermediate the bottom wall 15 of the ring groove and the adjacent one of the piston rings 16. In Figure 1, there is shown a solid compression ring 17 supported within the slot 13 and ventilated oil rings 18 and 19 supported within the grooves 11, 12. Extending transversely of the piston 14 are a plurality of spaced oil drainage ports, generally designated by the reference numerals 20. Each of the oil drainage ports has one end in communication with the interior of the piston 14, and has its other end in communication with the groove 11. Accordingly, upon moving the rings 16 over the bounding wall of the cylinder, not shown, considerable oil pressure is built up ahead of the rings. This pressure builds up to such an extent that oil passes the cylinder-contacting face of the ring and the pressure is then suddenly relieved as the slot moves over the oil, so that the surface tension of the oil causes a wave of oil to rise up into the slots. Thus, excessive oil is removed from the cylinder. The aforementioned piston and piston ring structure is conventional and forms no part of the present invention. It is to be noted, however, that to effectively decrease engine noises, it is desirable to eliminate the metallic contact between the piston ring 16 and the bottom walls 15 of the piston grooves 11, 12 and 13. Furthermore, it is desirable to exert the uniform force at all points along the piston ring 16, to thereby form an effective seal between the latter and the cylinder wall and to effect a relatively uniform removal of excess oil from the cylinder wall.

Accordingly, the expander rings of the present invention are supported in each of the ring grooves 11, 12 and 13, as previously described. The expander rings are fabricated of a resilient, rubber-containing material, adapted to withstand the normal operating temperatures found in the cylinders of combustion engines. The expander ring 10 embodies an elongated body 21 which includes a pair of bars 22 and 23 having rectangular cross sections disposed in superimposed spaced relation with respect to each other. Extending between the bars 22 and 23 at spaced intervals therealong are the connecting links, generally designated by the reference numeral 24. Each of the connecting links is rectangular in cross-section and has one end secured to the bar 22 and has the other end secured to the bar 23. As clearly shown in Figure 4, one face of the connecting links 24 is disposed in coplanar relation with respect to the adjacent side face of the bars 22 and 23, while the other face thereof, designated by the reference numeral 25, terminates adjacent to and spaced from the opposite side face of said bars.

In actual use, the expander rings 10 are inserted within the ring grooves 11 with the coplanar side faces of the bars 22 and 23 and the connecting links 24 abutting against the bottom walls 15 of the grooves. The piston rings, namely, the oil rings 18 and 19 and the compression ring 17 are then circumposed about the expander rings. It is to be noted that the disposition of the side faces 25 of the connecting links 24 with respect to the adjacent side faces of the bars 22 and 23 permit the portions of the bars 22 and 23 which project beyond the aforementioned side faces to be slightly compressed. Accordingly, in the event that the expander rings are slightly larger than desirable, a clearance will be provided intermediate the extended portions of the bars which permits the expander ring to be slightly compressed.

When assembled within the groove 13, the expander ring 10 exerts a uniform pressure against the inner periphery of the compression ring 17. Similarly, the expander rings disposed within the grooves 11 and 12 exert a uniform pressure against the ventilated oil rings 18 and 19. The spacing intermediate the connecting links 24 permits the excess oil to flow inwardly from the cylinder wall through the ventilated oil ring 18 into the bore 20, and thence into the interior of the piston.

The ring should preferably be of one of the well known oil-resistant, resilient compositions, such as neoprene (polymerized chlorobutadiene) or one of the oil-resistant, resilient copolymers of butadiene with a minor proportion of acrylonitrile, which are available commercially under such trade names as Hycar and Paracril. These oil-resistant rubbers have the property of resisting change under high temperature service somewhat better than natural rubber, which is especially desirable in this type of service.

Although only one embodiment of the expander ring of the present invention has been described, it is readily apparent that numerous modifications can be made without departing from the spirit of the invention as set forth in the appended claim.

What I claim is:

An expander ring for support in the ring groove of a piston intermediate the bottom face of said groove and a piston ring comprising an elongated body fabricated of resilient material and including a pair of bars having rectangular cross-sections disposed in superimposed spaced relation with respect to each other, and means disposed intermediate said bars at spaced intervals therealong for securing said bars together and forming therebetween a plurality of longitudinally spaced grooves for the passage therethrough of oil, said means comprising connecting links having rectangular cross-sections and each having its ends secured to said bars, and each of said connecting links having one side face arranged in coplanar relation with respect to one side face of said bars and having the other side face thereof terminating adjacent to and spaced from the opposite side face of said bars.

ALTO J. DAVIS.

REFERENCES CITED

The following references are of record in the file of this patent:

UNITED STATES PATENTS

| Number | Name | Date |
| --- | --- | --- |
| 1,723,432 | Morton | Aug. 6, 1929 |
| 2,078,519 | Wilkening | Apr. 27, 1937 |
| 2,369,263 | Teetor | Feb. 13, 1945 |
| 2,465,521 | Marien | Mar. 29, 1949 |